US010528053B2

(12) United States Patent
Kim

(10) Patent No.: US 10,528,053 B2
(45) Date of Patent: Jan. 7, 2020

(54) VEHICLE CONTROL DEVICE MOUNTED ON VEHICLE AND METHOD FOR CONTROLLING THE VEHICLE

(71) Applicant: LG ELECTRONICS INC., Seoul (KR)

(72) Inventor: Manwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 15/833,817

(22) Filed: Dec. 6, 2017

(65) Prior Publication Data

US 2019/0025842 A1 Jan. 24, 2019

(30) Foreign Application Priority Data

Jul. 18, 2017 (KR) .................. 10-2017-0091166

(51) Int. Cl.
*G05D 1/02* (2006.01)
*B60W 30/00* (2006.01)
*G01C 21/36* (2006.01)
*G05D 1/00* (2006.01)
*G01C 21/34* (2006.01)

(52) U.S. Cl.
CPC .......... *G05D 1/0221* (2013.01); *B60W 30/00* (2013.01); *G01C 21/3484* (2013.01); *G01C 21/3641* (2013.01); *G05D 1/0061* (2013.01); *G05D 1/0276* (2013.01); *G05D 2201/0213* (2013.01)

(58) Field of Classification Search
USPC .......................................................... 701/26
See application file for complete search history.

(56) References Cited

U.S. PATENT DOCUMENTS

| 10,156,849 | B1* | 12/2018 | Zych | G05D 1/0214 |
|---|---|---|---|---|
| 2015/0339928 | A1* | 11/2015 | Ramanujam | G08G 1/202 |
| | | | | 701/23 |
| 2017/0297586 | A1* | 10/2017 | Li | G05D 1/0088 |
| 2018/0107942 | A1* | 4/2018 | Jiang | G05D 1/0291 |
| 2018/0126986 | A1* | 5/2018 | Kim | B60W 30/09 |
| 2018/0136655 | A1* | 5/2018 | Kim | B60N 2/002 |
| 2018/0328750 | A1* | 11/2018 | Yun | G01C 21/3415 |
| 2019/0025842 | A1* | 1/2019 | Kim | G05D 1/0221 |

FOREIGN PATENT DOCUMENTS

| JP | 2008170404 | 7/2008 |
|---|---|---|
| JP | 2009018623 | 1/2009 |
| JP | 2013031389 | 2/2013 |
| JP | 2015032292 | 2/2015 |
| JP | 2017013749 | 1/2017 |
| KR | 1020170015240 | 2/2017 |

OTHER PUBLICATIONS

Korean Intellectual Property Office Application No. 10-2017-0091166, Office Action dated Jan. 2, 2019, 9 pages.

* cited by examiner

*Primary Examiner* — Tyler D Paige
(74) *Attorney, Agent, or Firm* — Lee Hong Degerman Kang & Waimey

(57) ABSTRACT

A vehicle control device includes a memory and a processor. The processor is configured to store, in the memory, driving information that is based on driving of a vehicle in a manual driving mode, and cause the vehicle to drive in an autonomous driving mode based on the stored driving information.

15 Claims, 14 Drawing Sheets

VEHICLE CONTROL DEVICE MOUNTED ON VEHICLE AND METHOD FOR CONTROLLING THE VEHICLE

CROSS-REFERENCE TO RELATED APPLICATIONS

Pursuant to 35 U.S.C. § 119(a), this application claims the benefit of earlier filing date and right of priority to Korean Application No. 10-2017-0091166, filed on Jul. 18, 2017, the contents of which are incorporated by reference herein in their entirety.

BACKGROUND OF THE INVENTION

1. Field of the Invention

The present disclosure relates to a vehicle control device provided in a vehicle and a method for controlling a vehicle.

2. Background of the Invention

A vehicle is an apparatus allowing a user who gets therein to move in a desired direction. Such a vehicle may be typically an automobile, for example.

For convenience of a person using a vehicle, various sensors and electronic devices are provided. In particular, for driving convenience of a user, research into an advanced driver assistance system (ADAS) has been actively conducted. In addition, autonomous vehicles have been actively developed.

Various types of lamps may be provided in a vehicle. In general, a vehicle has various vehicle lamps having a lighting function for allowing a driver to easily check or view an object positioned in the vicinity of the vehicle when driving at night and a signal function for informing another vehicle or a road user about a driving state of the vehicle.

For example, a vehicle may have a device that directly emits light using a lamp such as a headlight irradiating light to a front side to allow a driver to secure a visual field, a brake light turned on when the driver steps on a brake, a turn signal used when turning to the right or turning to the left.

In another example, a reflector reflecting light allowing the vehicle to be easily recognized from outside is installed on a front side or a rear side of the vehicle.

An installation reference or standard of the vehicle lamp are defined by regulations to allow each function to be sufficiently exhibited.

Recently, as advanced driving assist system (ADAS) has been actively developed, the necessity to develop a technique capable of maximizing user convenience and safety in driving a vehicle has emerged.

Also, recently, various technologies for autonomously driving a vehicle have been actively developed.

SUMMARY

Therefore, an aspect of the detailed description is to provide a vehicle control device for causing a vehicle to autonomously drive (or causing a vehicle to perform autonomous driving) in an optimized manner, and a method for controlling a vehicle.

Another aspect of the detailed description is to provide a vehicle control device capable of causing a vehicle to autonomously drive on the basis of information related to driving learned through manual driving, and a method for controlling a vehicle.

Another aspect of the detailed description is to provide a vehicle control device capable of causing a vehicle to autonomously drive by controlling an autonomous driving mode through learning and an autonomous driving mode through a sensing unit in an optimized manner, and a method for controlling a vehicle.

Features of the disclosure are not-limited by the above-mentioned technical tasks, and other tasks can be clearly understood from the following description by those having ordinary skill in the technical field to which the present invention pertains.

To achieve these and other advantages and in accordance with one purpose of this specification, as embodied and broadly described herein, a vehicle control device includes: a memory; and a processor storing, in the memory, driving information regarding driving of a vehicle in a manual driving mode, and causing the vehicle to drive in an autonomous driving mode on the basis of the stored driving information, wherein the processor causes the vehicle to autonomously drive using the driving information stored in the memory through the manual driving mode.

The processor may store driving information regarding driving of the vehicle from a first spot to a second spot different from the first spot in the manual driving mode, and when the vehicle reaches the first spot, the processor may cause the vehicle to drive in the autonomous driving mode on the basis of the stored driving information.

The driving information regarding driving in the manual driving mode may include at least one of driving trace information regarding driving of the vehicle and driving pattern information of the vehicle.

The driving trace information may include location information of a plurality of spots at which the vehicle was placed, and the driving pattern information may include at least one of steering angle information at each of the plurality of spots and speed information at each of the plurality of spots.

The processor may cause the vehicle to autonomously drive on the basis of any one of a first scheme in which the vehicle autonomously drives using only the driving trace information included in the driving information and a second scheme in which the vehicle autonomously drives according to the driving trace information and the driving pattern information included in the driving information.

The vehicle control device may further include: a sensing unit sensing information related to the vehicle, wherein the processor causes the vehicle to autonomously drive in the autonomous driving mode on the basis of information related to the vehicle sensed through the sensing unit.

The processor may cause the vehicle to autonomously drive using at least one of a first autonomous driving mode in which the vehicle autonomously drives on the basis of the driving information stored in the memory and a second autonomous driving module in which the vehicle autonomously drives on the basis of information related to the vehicle sensed through the sensing unit.

In the first autonomous driving mode, the processor may change at least a portion of the driving information on the basis of the information related to the vehicle sensed through the sensing unit, and cause the vehicle to autonomously drive on the basis of the changed driving information.

In the second autonomous driving mode, when preset conditions are met, the processor may switch a driving mode of the vehicle from the second autonomous driving mode to the first autonomous driving mode.

When the preset conditions are released in the first autonomous driving mode, the processor may restore the driving mode of the vehicle from the first autonomous driving mode to the second autonomous driving mode.

The processor may cause the vehicle to autonomously drive to a destination using a plurality of pieces of route information regarding routes in which the vehicle autonomously drives to the destination through at least one of the first autonomous driving mode and the second autonomous driving mode.

The processor may set new route information according to preset conditions using the plurality of pieces of route information.

The processor may set the new route information by dividing a predetermined region into a plurality of sections with respect to a crossing point at which a plurality of routes cross each other and combining the plurality of sections.

The new route information may include a section in which the vehicle can drive in the first autonomous driving mode and a section in which the vehicle can drive in the second autonomous driving mode.

The vehicle control device may further include: a display unit, wherein, when a destination is set, the processor may output, on the display unit, route information regarding a route available for driving in the first autonomous driving mode and route information regarding a route available for driving in the second autonomous driving mode, and set the new route information on the basis of a touch applied to the display unit.

The vehicle control device may further include: a communication unit, wherein when information for calling the vehicle to a location of a mobile terminal different from a current location of the vehicle is received from the mobile terminal through the communication unit, the processor may search for information of a route in which the vehicle can autonomously drive to the location of the mobile terminal using at least one of the first and second autonomous driving modes.

When the route information is searched, the processor may transmit information related to the searched route information to the mobile terminal through the communication unit.

To achieve these and other advantages and in accordance with the purpose of this specification, as embodied and broadly described herein, a vehicle includes the vehicle control device described above To achieve these and other advantages and in accordance with the purpose of this specification, as embodied and broadly described herein, a method for controlling a vehicle includes: storing, in a memory, driving information regarding driving of a vehicle in a manual driving mode; and causing the vehicle to drive in an autonomous driving mode on the basis of the stored driving information.

The driving information regarding driving in the manual driving mode may include at least one of driving trace information regarding driving of the vehicle and driving pattern information of the vehicle, and in causing the vehicle to drive, the vehicle may be caused to autonomously drive on the basis of any one of a first scheme in which the vehicle autonomously drives using only the driving trace information included in the driving information and a second scheme in which the vehicle is autonomously drives according to the driving trace information and the driving pattern information included in the driving information.

Also, in causing the vehicle to drive in the autonomous driving mode, the vehicle may be caused to autonomously drive using at least one of a first autonomous driving mode in which the vehicle autonomously drives on the basis of the driving information stored in the memory and a second autonomous driving mode in which the vehicle autonomously drives on the basis of information related to vehicle sensed through the sensing unit.

Details of embodiments are included in detailed descriptions and drawings.

According to embodiments of the present disclosure, one or more effects may be obtained as follows.

First, the present disclosure may provide the new autonomous driving method capable of causing a vehicle to autonomously drive on the basis of information related to driving learned through manual driving.

Second, the present disclosure may provide the vehicle control device capable of causing a vehicle to autonomously drive through at least one of a learning autonomous driving mode learned through manual driving and a sensor autonomous driving mode using a sensing unit and the method for controlling a vehicle.

Third, the present disclosure may provide a method for controlling a vehicle, capable of causing a vehicle to autonomously drive in the learning autonomous driving mode in a section in which it is impossible to drive in the sensor autonomous driving mode Fourth, the present disclosure may provide the method for controlling a vehicle, capable of performing an optimized autonomous driving mode of a vehicle by causing the vehicle to drive in any one of the learning autonomous driving mode and the sensor autonomous driving mode or using a combination of both modes.

Advantages and effects of the present disclosure are not limited to the foregoing effects and any other technical effects not mentioned herein may be easily understood by a person skilled in the art from the descriptions of claims.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

DETAILED DESCRIPTION

Figure 1:
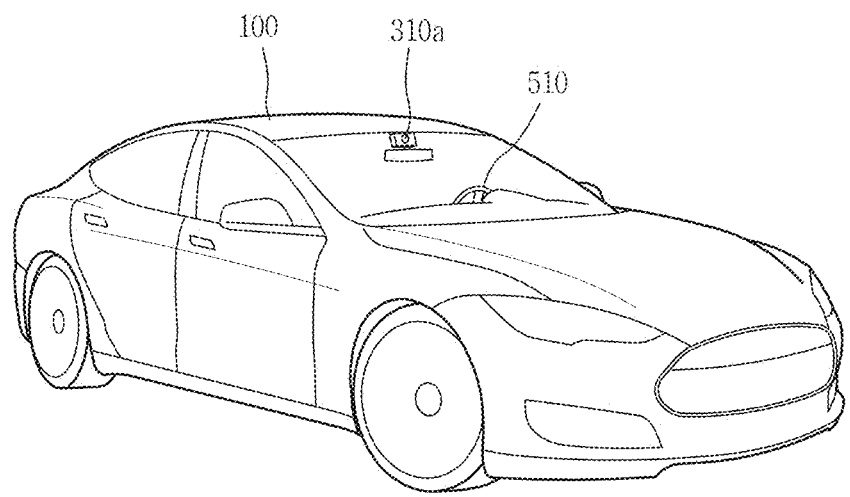
FIG. 1 illustrates a vehicle according to an embodiment of the present disclosure.
Figure 1:
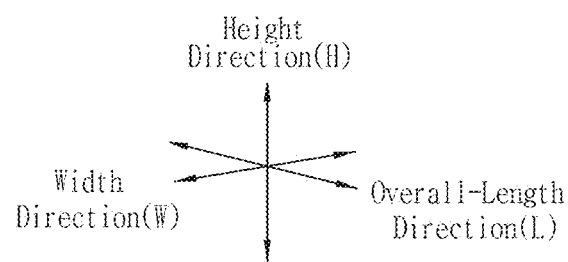
Figure 2A:
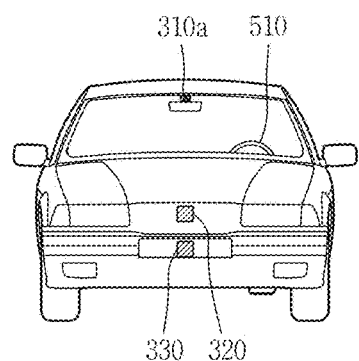
FIGS. 2A, 2B, and 2C are respectively front, rear, and top views of the vehicle of FIG. 1.
Figure 2B:
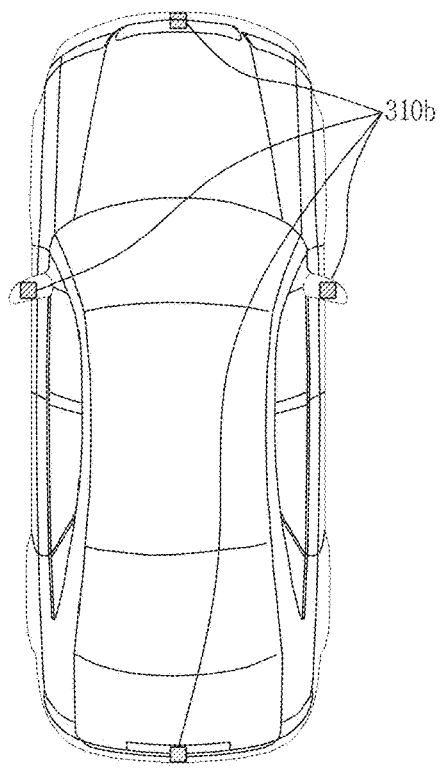
Figure 2C:
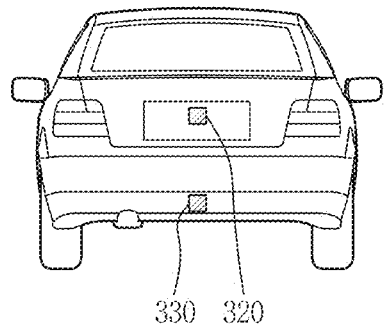
Figure 3:
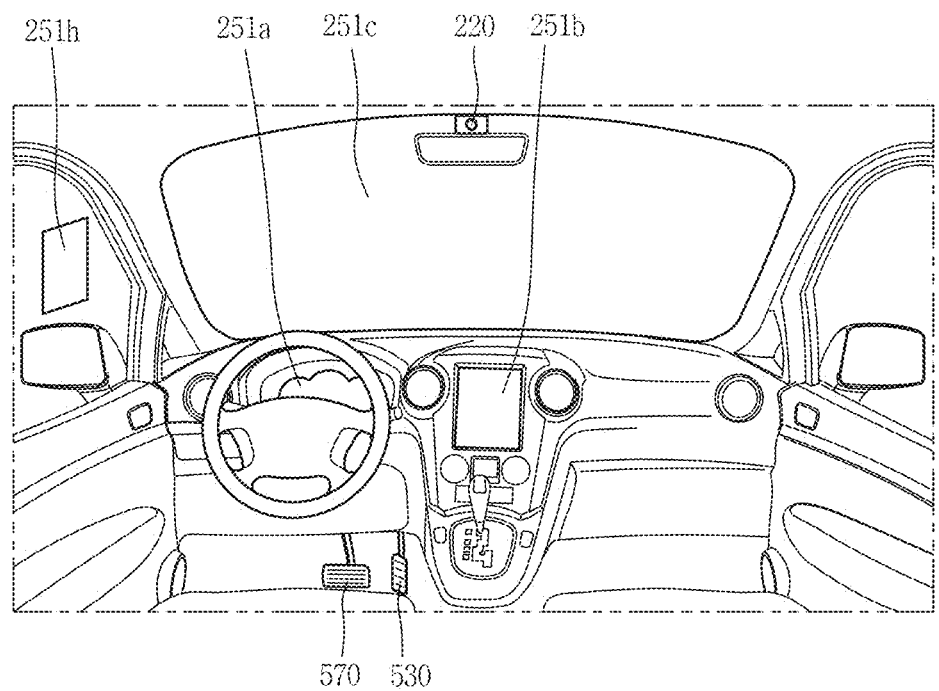
FIGS. 3 and 4 illustrate the inside of a vehicle according to an embodiment of the present disclosure.
Figure 4:
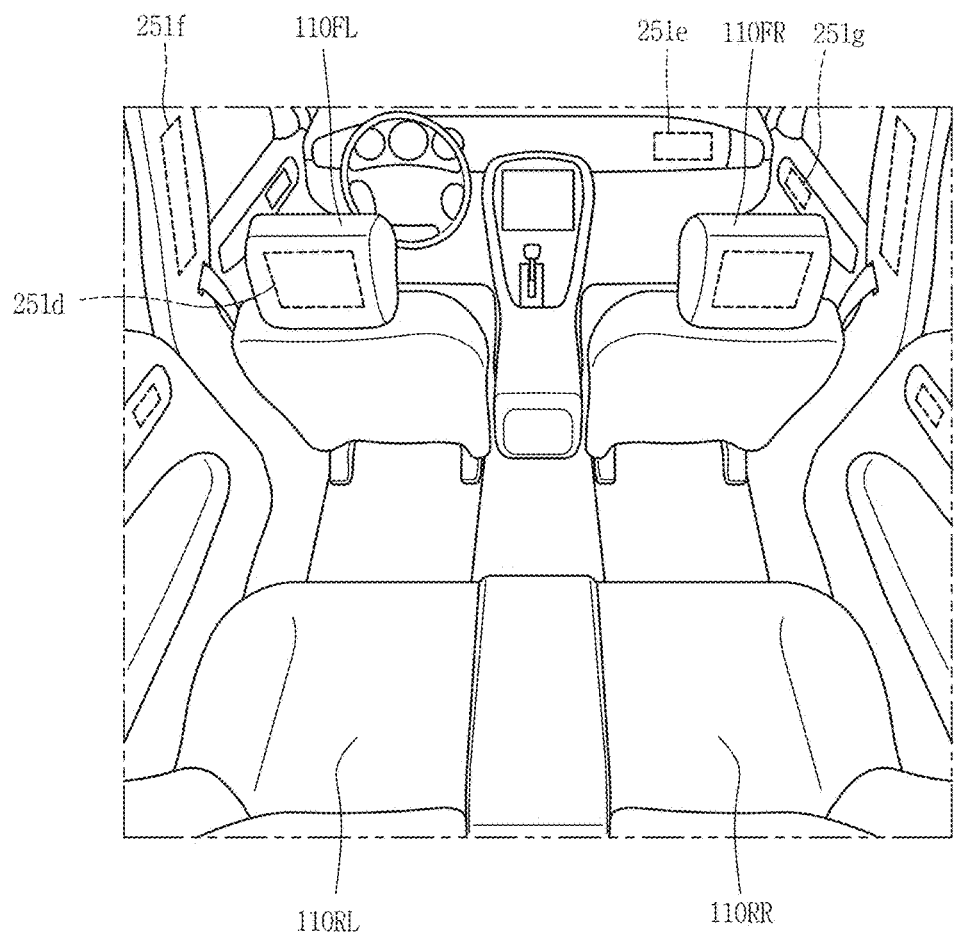

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as including cars, motorcycles and the like. Hereinafter, the vehicle will be described based on a car.

The vehicle according to the embodiment of the present invention may include an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

As shown in the figures, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

Figure 7:
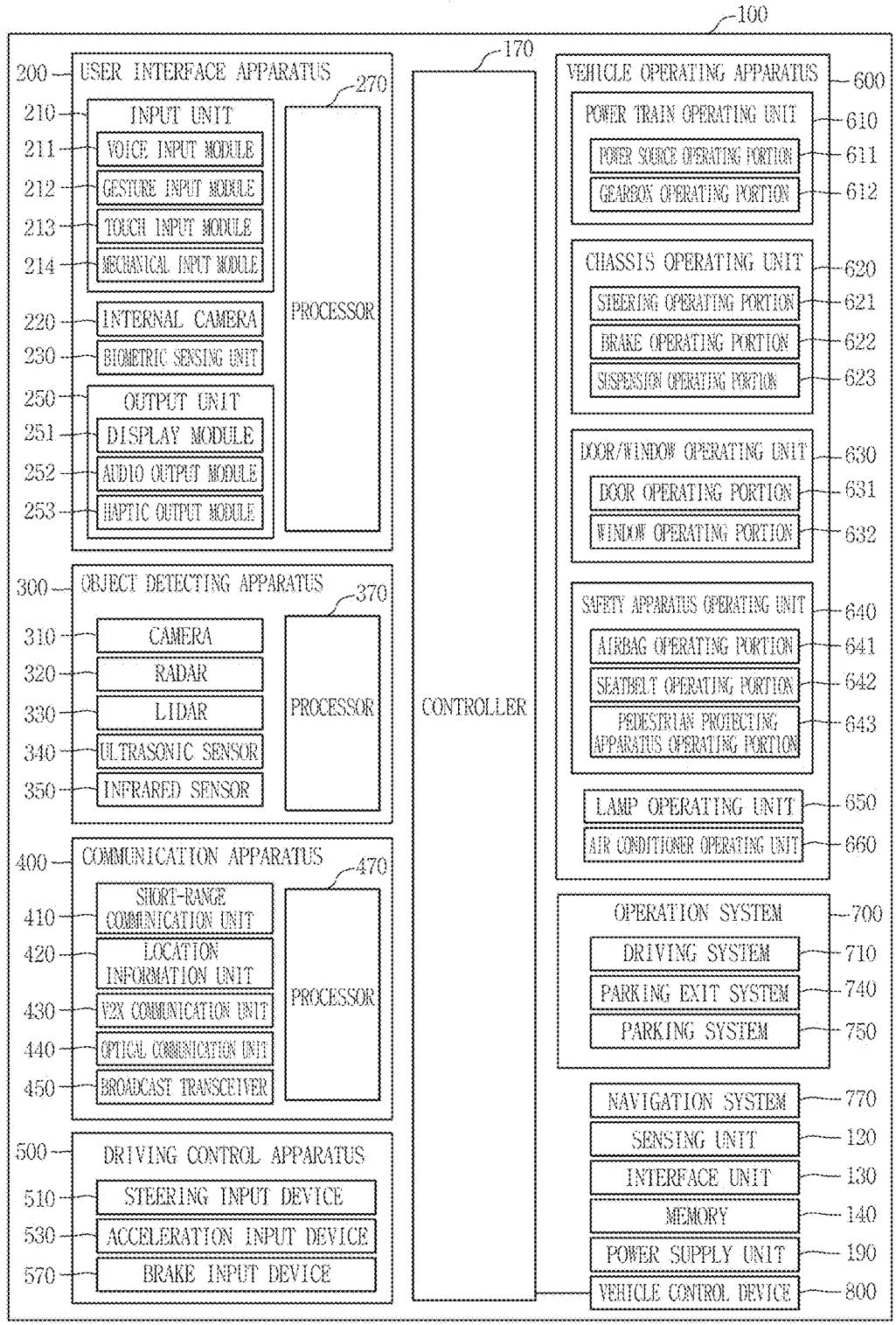
FIG. 7 is a block diagram of various components utilized in a vehicle according to an embodiment of the present disclosure.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 210 may allow the user to input information. Data collected in the input unit 120 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display or an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

The user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. The audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Figure 5:
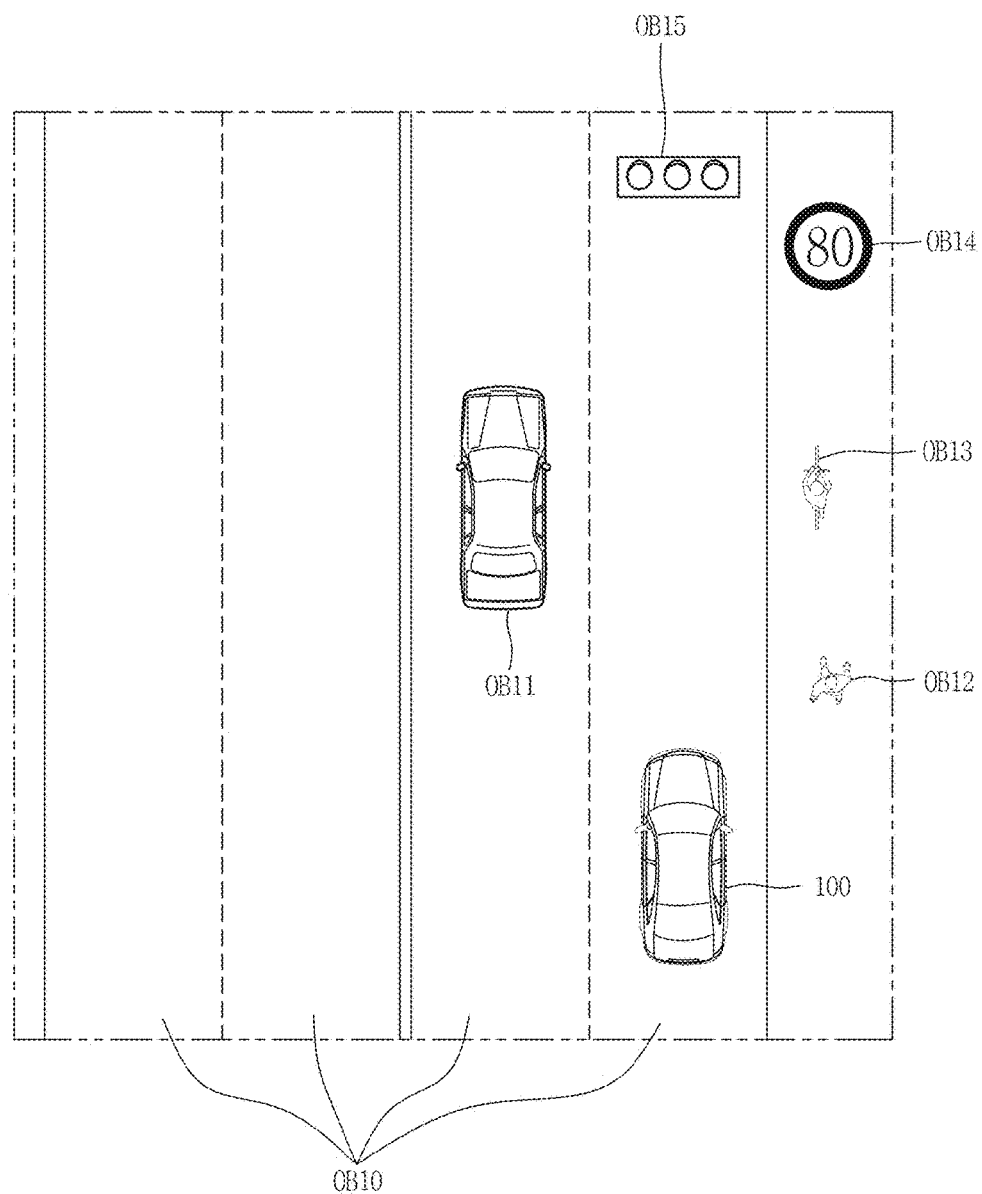
FIGS. 5 and 6 show examples of objects relative to a vehicle according to an embodiment of the present disclosure.
Figure 6:
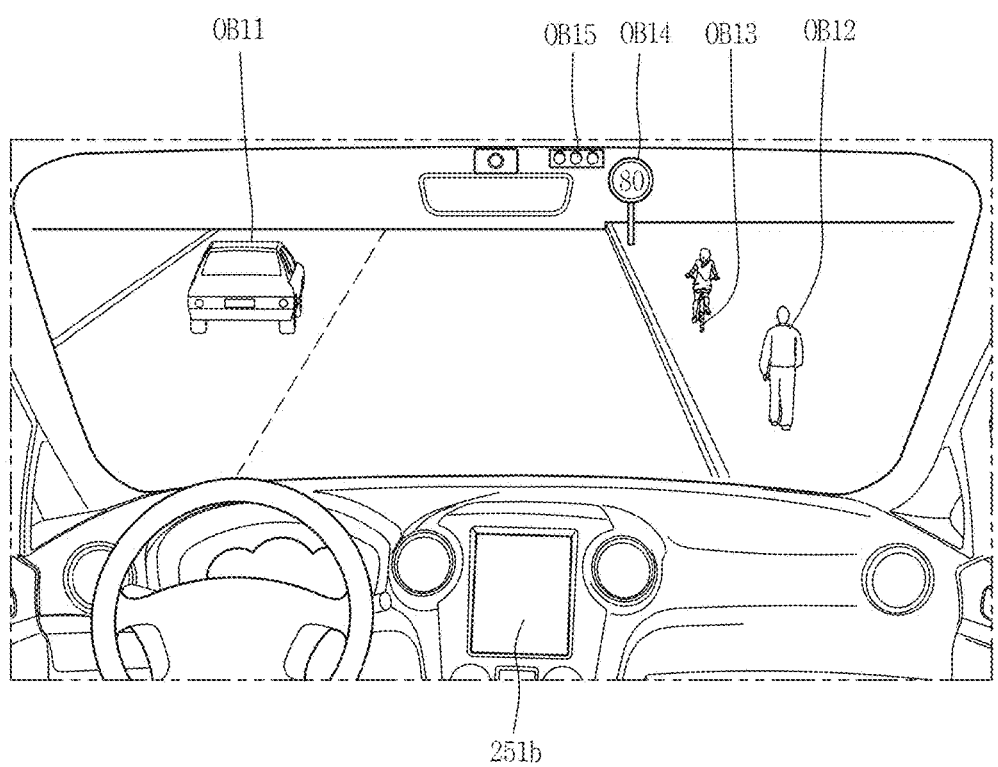

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like. Objects may be classified as a moving object or a fixed object. For example, the moving object may include another vehicle or a pedestrian. The fixed object may include a traffic signal, a road or a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle, or the camera 310 may be disposed adjacent to a front bumper or a radiator grill.

For example, the camera 310 may be disposed adjacent to a rear glass within the vehicle to acquire a rear image of the vehicle, or the camera 310 may be disposed adjacent to a rear bumper, a trunk or a tail gate.

For example, the camera 310 may be disposed adjacent to at least one of side windows within the vehicle to acquire a side image of the vehicle, or the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 related to the present disclosure may include a vehicle control device 800.

The vehicle control device 800 may control at least one of the components described above with reference to FIG. 7. In this point of view, the vehicle control device 800 may be the controller 170.

However, without being limited thereto, the vehicle control device 800 may be a separate component independent from the controller 170. When the vehicle control device 800 is implemented as a component independent from the controller 170, the vehicle control device 800 may be provided in a portion of the vehicle 100.

Hereinafter, for the purposes of description, it is assumed that the vehicle control device 800 is a separate component independent from the controller 170. Functions (operations) and control method described with respect to the vehicle control device 800 may be performed by the controller 170 of a vehicle. That is, all contents described in relation to the vehicle control device 800 may also be inferred and applied to the controller 170 in the same or similar manner.

Also, the vehicle control device 800 described in this disclosure may include the components described above with reference to FIG. 7 and some of various components provided in the vehicle. In this disclosure, for the purposes of description, the components described above with reference to FIG. 7 and some of various components provided in the vehicle will be given separate names and reference numerals and described accordingly.

Hereinafter, the components included in the vehicle control device 800 according to an embodiment of the present disclosure will be described in detail.

Figure 8:
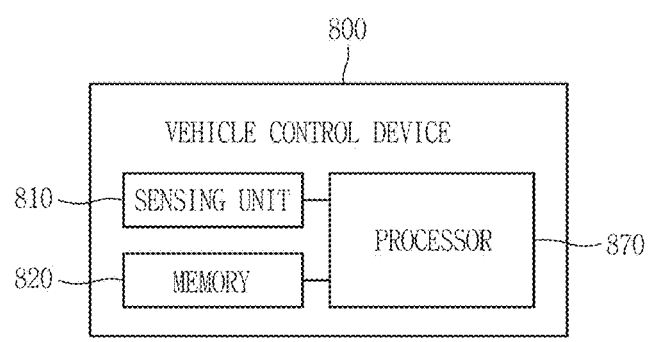
FIG. 8 is a block diagram of a vehicle control device according to an embodiment of the present disclosure.

FIG. 8 is a block diagram of a vehicle control device according to an embodiment of the present disclosure. The vehicle control device 800 may include a sensing unit 810, a memory 820, a processor 870, and the like.

The vehicle control device 800 related to the present disclosure may include the sensing unit 810. The sensing unit 810 may be the object detecting apparatus 300 described above with reference to FIG. 7 or the sensing unit 120 provided in the vehicle 100.

The sensing unit 810 may be implemented by combining at least two of the camera 310, the radar 320, the LiDAR 330, the ultrasonic sensor 340, the infrared sensor 350, or the sensing unit 120 included in the object detecting apparatus 300.

The sensing unit 810 may sense information related to the vehicle 100 of the present disclosure.

The information related to the vehicle may be at least one of vehicle information (or a driving state of the vehicle) and surrounding information of the vehicle.

For example, the vehicle information may include a driving speed of a vehicle, a weight of the vehicle, the number of occupants of the vehicle, braking power of the vehicle, maximum braking power of the vehicle, a driving mode of the vehicle (whether it is an autonomous driving mode or a manual driving mode), a parking mode of the vehicle (autonomous parking mode, automatic parking mode, or a manual parking mode), whether the user is present in the vehicle and information related to the user (e.g., whether the user is an authenticated user or not), and the like.

The surrounding information of the vehicle may include, for example, a state (frictional force) of a road surface on which the vehicle is driving, weather, a distance to a preceding vehicle (or subsequent vehicle), a relative speed of a preceding vehicle (or a subsequent vehicle), a bending rate of a curve when a lane in which the vehicle is driving is a curve, information related to an object present within a reference region (predetermined region) with respect to the vehicle, whether an object enters/leaves the predetermined region, whether a user is present in the vicinity of the vehicle, information related to the user (e.g., whether the user is an authenticated user or not), and the like.

Also, the surrounding information (or surrounding environmental information) of the vehicle may include external information of the vehicle (e.g., peripheral brightness, temperature, location of the sun, information of a peripheral subject (person, another vehicle, a sign, etc.), a type of a road surface on which the vehicle is driving, a geographic feature, line information, or lane information), and information required for autonomous driving/autonomous parking/automatic parking/manual parking mode.

Also, the surrounding information of the vehicle may further include a distance between an object present in the vicinity of the vehicle 100 and the vehicle 100, a type of the object, a parking space in which the vehicle may park, an object (e.g., a parking line, a string, another vehicle, a wall, etc.) for identifying the parking space, and the like.

Also, the information related to the vehicle may include whether the mobile terminal is held in a holder provided in the vehicle, whether the mobile terminal is present within the vehicle, whether the mobile terminal has entered an area within a predetermined distance from the vehicle (or whether the mobile terminal is present within the predetermined distance), whether the mobile terminal and the vehicle control device are connected for communication, and the like.

The information related to the vehicle sensed through the sensing unit 810 may be used in the autonomous driving mode for autonomous driving of the vehicle. In detail, the processor 870 may autonomous drive the vehicle using the information related to the vehicle sensed through the sensing unit 810.

Also, the vehicle control device 800 may include a memory 820.

The memory 820 may be the memory 140 described above with reference to FIG. 7.

The memory 820 may store (record) various types of information. For example, the memory 140 may store information related to the vehicle sensed through the sensing unit 810.

The memory 820 may be provided to store, change, or delete information under the control of the processor 870.

Meanwhile, when the vehicle drives in a manual driving mode, information related to driving learned through manual driving may be stored in the memory 820 under the control of the processor 870.

The information related to driving may include driving information (or traveling information) acquired as the vehicle drives in the manual driving mode (or driving information regarding driving of the vehicle in the manual driving mode).

Learning driving information described in this disclosure may refer to storing, recording, or generating driving information. For example, learning information related to driving through manual driving may include a meaning of storing (generating, recording) driving information regarding driving of the vehicle in the manual driving mode, in the memory.

Contents related to information related to driving (or driving information) will be described in detail with reference to the accompanying drawings.

Information related to driving learned through manual driving (or driving information regarding driving in the manual driving mode) may also be used in the autonomous driving mode of the vehicle.

Also, the vehicle control device 800 of the present disclosure may include the processor 870 capable of controlling the memory 810, the sensing unit 820, and the like.

The processor 870 may be the controller 170 described above with reference to FIG. 7.

The processor 870 may control the components described above with reference to FIG. 7 and the components described above with reference to FIG. 8.

Also, the processor 870 may store route information regarding a route in which the vehicle 100 drove in the manual driving mode (information related to driving learned through manual driving) in the memory 820. Thereafter, the processor 870 may drive the vehicle 100 in the autonomous driving mode on the basis of the stored driving information (or information related to driving).

Hereinafter, an optimized method for autonomously driving a vehicle of the present disclosure will be described in detail with reference to the accompanying drawings.

Figure 9:
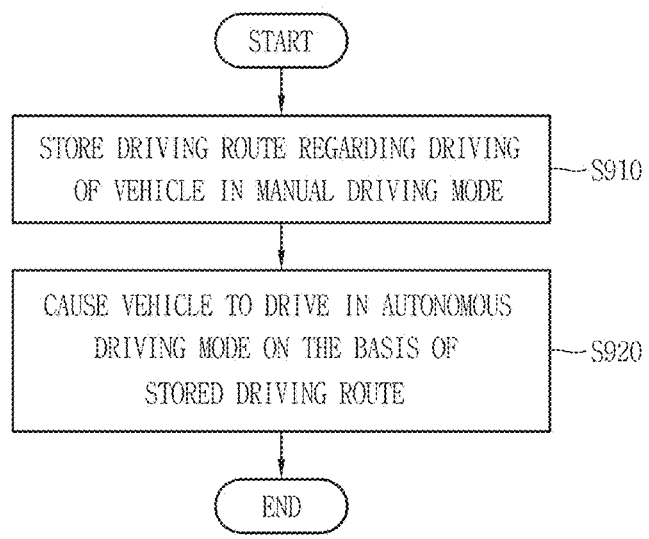
FIG. 9 is a flowchart illustrating a control method of the present disclosure.

FIG. 9 is a flowchart illustrating a control method of the present disclosure. In this figure, driving information regarding driving of the vehicle in the manual driving mode is stored (S910).

The processor 870 of the present disclosure may store information related to driving learned through manual driving in the memory 820. As described above, learning information related to driving may refer to storing driving information acquired when the vehicle drove in the manual driving mode.

That is, the information related to driving may include driving information (or driving route information).

The processor 870 may store driving information regarding driving of the vehicle in the manual driving mode in the memory 820.

In detail, the processor 870 may store, in the memory 820, driving information acquired when the vehicle 100 drives from a first spot to a second spot different from the first spot in the manual driving mode.

Also, when the vehicle 100 reaches the first spot, the processor 870 may drive the vehicle in the autonomous driving mode on the basis of the stored driving information.

That is, the processor 870 may store, in the memory 820, the driving information acquired when the vehicle drives from the first spot to the second spot in the manual driving mode, and when the vehicle 100 is positioned after the first spot, the processor 870 may cause the vehicle 100 to autonomously drive on the basis of the stored driving information.

Here, the processor 870 may cause the vehicle to autonomously drive in the same driving manner as that when the vehicle drove in the manual driving mode, on the basis of the stored driving information.

That is, in this disclosure, causing the vehicle to autonomously drive on the basis of the driving information stored in the memory may refer to causing the vehicle to autonomously drive in the same driving manner (or in the same driving pattern or in the same driving mode) as that when the vehicle drove in the manual driving mode, rather than causing the vehicle to autonomously drive using a sensor along the same route as that when the vehicle drove in the manual driving mode.

In other words, in this disclosure, causing the vehicle to autonomously drive on the basis of the driving information stored in the memory may refer to causing the vehicle to drive in the autonomous driving mode in the same driving manner as that when the vehicle drove in the manual driving mode, according to the driving information acquired when the vehicle drove in the manual driving mode.

That is, the processor 870 may cause the vehicle to autonomously drive in the same driving manner as that when the vehicle drove in the manual driving mode, according to the driving information regarding driving of the vehicle in the manual driving mode.

If the vehicle is driven in the autonomous driving mode on the basis of the driving information acquired when the vehicle drove in the manual driving mode, when the vehicle of the present disclosure is driving in a specific section (e.g., a section between a first spot and a second spot), the vehicle may autonomously drive to follow the same trace (or course or route) or may repeatedly autonomous drive in the specific section in the same driving manner (in the same driving pattern) each time.

The driving information (driving route information) regarding the driving of the vehicle in the manual driving mode may include at least one of driving trace information regarding driving of the vehicle and driving pattern information of the vehicle.

The driving trace information may include position information of a plurality of spots where the vehicle was positioned. In detail, the driving trace information may refer to a manual driving path of the vehicle 100 obtained by connecting a plurality of spots where the vehicle drove in the manual driving mode.

The processor 870 may generate driving trace information of the vehicle which has driven in the manual driving mode using position information of the vehicle received through the position information unit.

Also, the processor 870 may generate driving trace information of the vehicle using the number of rotations of the wheels of the vehicle which is driving in the manual driving mode, an angle of wheels, and the like, even without using the position information unit.

Also, the driving pattern information may include at least one of steering angle information (rotation angle of a steering wheel) at each of the plurality of spots or a speed (speed of the vehicle) at each of the plurality of spots.

Also, the driving pattern information may include whether an accelerator was stepped on at each of the plurality of spots, a degree of stepping on the accelerator, whether a brake was stepped on, a degree of stepping on the brake, and the like.

That is, the driving pattern information may be associated with whether the brake was stepped on, whether the accelerator was stepped on, a degree of stepping up the brake, a degree of stepping up the accelerator, and the like, by the spots of the driving trace.

Since the information related to the driving described above includes driving information (or driving route information), at least one of the driving trace information (position information of a plurality of spots) and driving pattern information (steering angle information or speed information by the plurality of spots) may be included in the information related to driving.

Also, the information related to driving (or driving information regarding driving of the vehicle in the manual driving mode) may include sensor data sensed through the sensing unit 810 when the vehicle was driving in the manual driving mode.

The sensor data may include information related to the vehicle sensed by spots in which the vehicle drives in the manual driving mode.

The sensor data may include the information related to the vehicle described above. Also, the processor 760 may associate the sensor data by spots (or by times) of the vehicle which drives in the manual mode, to the driving information.

When a state of the vehicle 100 meets preset conditions, the processor 870 may store (generate) driving information regarding driving of the vehicle 100 in the manual driving mode, in the memory 820. The preset conditions may refer to conditions to which a function to start storing the driving information regarding driving of the vehicle in the manual driving mode in the memory 820 is associated.

The preset conditions may include various conditions and may include the following conditions, for example.

For example, when a user request is received, the processor 870 may start storing (generating) driving information when the vehicle drove in the manual driving mode. That is, the processor 870 may store driving information (information related to driving) regarding driving of the vehicle in the manual driving mode, in the memory 820 (or the processor 870 may start storing the driving information.

In another example, in cases where the vehicle reaches a spot in which autonomous driving of the vehicle using the sensing unit 810 is impossible (or in cases where the vehicle enters a road in which autonomous driving of the vehicle using the sensing unit 810 is impossible), the processor 870 may store driving information regarding driving of the vehicle in the manual driving mode in the memory 820 (or start to store the driving information).

In another example, when location information of the vehicle through the communication device 400 is not received (that is, when GPS information is not received), the processor 870 may store in the memory 820 driving information regarding driving of the vehicle in the manual driving mode (or may start storing).

In another example, in cases where a surrounding environment of the vehicle 100 makes it impossible for the vehicle to autonomously drive using the sensing unit 810, the processor 870 may store in the memory 820 driving information regarding driving of the vehicle in the manual driving mode (or start storing).

In another example, in cases where sensor data included in the information related to driving (or driving information regarding driving in the manual driving mode) and sensor data sensed through the sensing unit 810 while the vehicle is driving in the autonomous driving mode according to the driving information regarding driving in the manual driving mode stored in the memory are different, the processor 870 may store in the memory 820 new driving information regarding driving in the manual driving mode (or start storing).

The sensor data may be different from each other when a new object is sensed, when a previously existing object disappears, when a road disappears, when a road is deformed, or a road in which the vehicle has traveled in the manual driving mode is blocked by an obstacle, and the like.

The sensor data may include surrounding environment information of the vehicle when the vehicle is driving in the manual driving mode. The processor 870 may store in the memory 820 surrounding environment information of the vehicle driving in the manual driving mode using the sensor data such that the surrounding environment information is included in the driving information.

Also, the processor 870 may generate map data of the vehicle driving in the manual driving mode using sensor data. For example, the map data may be generated on the basis of information of peripheral objects (e.g., tree, a sign, a state of a building or a road). Examples of a state of road include whether a road is an unpaved road, whether a road is covered with snow, whether a road is covered with leaves, and the like.

The processor 870 may generate map data using the sensor data and generate driving information in association with driving trace information or driving pattern information regarding driving of the vehicle in the manual driving mode in the corresponding map data.

Also, the processor 870 may store in the memory driving information generated such that the driving trace information or the driving pattern information regarding driving of the vehicle in the manual driving mode.

In addition, the processor 870 may store in the memory 820 driving information regarding driving of the vehicle in the manual driving mode according to various situations.

That is, when a state of the vehicle 100 meets the preset conditions, the processor 870 may start learning of driving information regarding driving in the manual driving mode (i.e., start learning information regarding driving through manual driving).

The processor 870 may determine a spot (position) of the vehicle located when the state of the vehicle 100 meets the preset conditions, as a first spot. That is, the first spot may refer to a start point of driving information regarding driving in the manual driving mode.

The driving information (information related to driving) stored in the memory 820 may be a plurality of pieces of information, and the first spot may be varied depending on a spot of the vehicle located at the time when the preset conditions are met.

Meanwhile, the processor 870 may determine a spot at which the vehicle 100 is positioned at the time when a state of the vehicle meets specific conditions, as a second spot. That is, the second spot may refer to an end point of driving information regarding driving in the manual driving mode.

The specific conditions may include a condition in which the vehicle stalls, a condition in which the vehicle is stopped form a predetermined period of time, a condition in which a vehicle door is opened or a new user input is received after the vehicle stalls, and the like.

The second spot may be varied depending on a spot of the vehicle 100 located when the specific conditions are met.

Hereinafter, for the purposes of description, information used for the vehicle to perform the autonomous driving mode will be described as driving information and driving route information regarding driving in the manual driving mode. That is, hereinafter, driving the vehicle in the autonomous driving mode on the basis of driving information regarding driving in the manual driving mode may be understood as driving the vehicle in the autonomous driving mode on the basis of information related to driving learned through manual driving.

The processor 870 may cause the vehicle to automatically drive on the basis of the driving information stored in the memory 820. Here, autonomously driving the vehicle according to the driving information stored in the memory 820 may be referred to as learned autonomous driving, learning autonomous driving mode, learning-based autonomous driving, learning-based autonomous driving mode, and the like.

Here, the processor 870 may cause the vehicle to automatically drive using (with reference to) the sensor data included in the driving information (or information related to driving) stored in the memory.

For example, the processor 870 may cause the vehicle to automatically drive in the same driving manner as that in which the vehicle drove in the manual driving mode according to the driving information stored in the memory. When the sensor data included in the driving information stored in the memory and sensor data sensed through the sensing unit 810 during autonomous driving ends, the processor 870 may stop autonomous driving (learned autonomous driving) and the vehicle stopped.

Also, while the vehicle is autonomously driving according to the driving information stored in the memory, when it is sensed that sensor data included in the driving information stored in the memory and sensor data sensed through the sensing unit 810 during autonomous driving are different, the processor 870 may output notification information indicating that the vehicle should be switched to the manual driving mode, for recognition of the driver.

Meanwhile, autonomous driving of the vehicle on the basis of information related to the vehicle sensed through the sensing unit 810 may be referred to as sensor autonomous driving, sensor autonomous driving mode, sensor-based autonomous driving, sensor-based autonomous driving mode, and the like.

Thereafter, in the present disclosure, the vehicle may be driven in the autonomous driving mode on the basis of the stored driving information (S920). In detail, when driving information regarding driving in the manual driving mode is stored in the memory 820, the processor 870 may cause the vehicle to drive in the autonomous driving mode on the basis of the driving information. Here, the driving of the vehicle in the autonomous driving mode on the basis of the stored driving information may be understood as learning-based autonomous driving.

The vehicle control device 800 related to the present disclosure may cause the vehicle to autonomously drive in various manners in the learning-based autonomous driving mode.

In detail, the processor 870 may cause the vehicle 100 to autonomously drive on the basis of a first scheme in which the vehicle autonomously drives using only driving trace information included in the driving information stored in the memory 820 and a second scheme in which the vehicle 100 autonomously drives according to driving trace information and driving pattern information included in the driving information.

For example, the processor 870 may cause the vehicle to autonomously drive using only the driving trace information in the driving information regarding driving in the manual driving mode (first scheme)

The vehicle 100 may autonomously drive according to the driving trace information at a steering angle and speed different from steering angle information at each of a plurality of spots or speed information at each of the plurality of spots included in the driving information.

That is, the processor 870 may cause the vehicle to autonomously drive to follow only a trace of the vehicle along which the vehicle passed as included in the stored (learned) information but at a different steering angle and speed from those included in the stored (learned) driving information.

Here, the processor 870 may determine the steering angle and speed using the driving trace information and information related to the vehicle sensed through the sensing unit and cause the vehicle to autonomously drive.

In another example, the processor 870 may cause the vehicle to autonomously drive according to the driving trace information and the driving pattern information included in the driving information (second scheme).

The processor 870 may cause the vehicle 100 to autonomously drive to follow the same trace and at the same steering angle and speed as those included in route information regarding a route in which the vehicle drove in the manual driving mode. That is, the processor 870 may cause the vehicle 100 to autonomously drive to follow the same trace and in the same driving pattern as those included in the learned driving information.

Meanwhile, although the vehicle is autonomously driving according to the second scheme, the processor 870 may use information related to the vehicle sensed through the sensing unit 810. This is because, when an environment is different from an environment in which the driving information was stored (learned), an obstacle may be present or a road may be changed. Here, when the vehicle autonomously drives according to the second scheme, an accident may happen.

Thus, although the vehicle is autonomously driving according to the driving trace information and the driving pattern information included in the driving information, if an obstacle is sensed through the sensing unit 810 or a road is changed (or if a road is changed to a road in which the vehicle cannot easily pass through), the processor 870 may stop autonomous driving.

The processor 870 may output, to the driver, notification information indicating that driving in the autonomous driving mode is impossible, notification information guiding that the autonomous driving mode should be switched to the manual driving mode, and the like.

When the learning-based autonomous driving is performed, whether to perform autonomous driving according to the first scheme or the second scheme may be determined according to various conditions.

For example, in cases where the vehicle 100 can perform autonomous driving according to the first scheme on the basis of a current location of the vehicle 100, the processor 870 may cause the vehicle to autonomously drive according to the first scheme, and in cases where the vehicle 100 can perform autonomous driving according to the second scheme on the basis of a current location of the vehicle 100, the processor 870 may cause the vehicle to autonomously drive according to the second scheme.

In another example, in cases where the vehicle 100 is located in a spot in which the vehicle 100 can perform autonomous driving according to both the first and second schemes, the processor 870 may output, through the output unit, information inquiring as to which of the first and second schemes the vehicle is to perform autonomous driving, and may cause the vehicle 100 to autonomously drive according to any one of the first and second schemes on the basis of a user input.

In another example, the processor 870 may cause the vehicle to autonomously drive according to any one of the first and second schemes on the basis of whether a driver is present within the vehicle 100.

For example, when a driver gets in the vehicle 100, the processor 870 may cause the vehicle to autonomously drive according to the first scheme and when a driver does not get in the vehicle, the processor 870 may cause the vehicle to autonomously drive according to the second scheme.

In another example, the processor 870 may cause the vehicle to autonomously drive according to any one of the first and second schemes on the basis of whether the vehicle drove in a sensor-based autonomous driving mode before the vehicle autonomously drives in the learning-based autonomous driving mode.

For example, in cases where the vehicle drove in the sensor-based autonomous driving mode before the vehicle autonomously drives in the learning-based autonomous driving mode, the processor 870 may cause the vehicle to autonomously drive according to the first scheme. This is because the sensor is highly reliable in this situation.

When the vehicle did not drive in the sensor-based autonomous driving mode before the vehicle autonomously drives in the learning-based autonomous driving mode, the processor 870 may cause the vehicle to autonomously drive according to the second scheme.

Also, when a preset situation occurs (e.g., when an obstacle is present or when a road is changed) while the vehicle is autonomously driving according to the second scheme, the processor 870 may cause the vehicle to autonomously drive according to the first scheme.

The processor 870 related to the present disclosure may cause the vehicle to drive in the autonomous driving mode on the basis of information related to the vehicle sensed through the sensing unit 810.

As described above, causing the vehicle in the autonomous driving mode through the sensing unit 810 may be understood as sensor-based autonomous driving.

The processor 870 may cause the vehicle 100 to autonomously drive using at least one of a first autonomous driving mode (learning-based autonomous driving mode) in which the vehicle autonomously drives on the basis of driving information stored in the memory 820 and a second autonomous driving mode in which the vehicle autonomously drives on the basis of information related to the vehicle sensed through the sensing unit 810.

As described above, the first autonomous driving mode (learning-based autonomous driving mode) may include the first scheme in which the vehicle autonomously drives using only the driving trace information and the second scheme in which the vehicle autonomously drives using the driving trace information and the driving pattern information.

Figure 10:
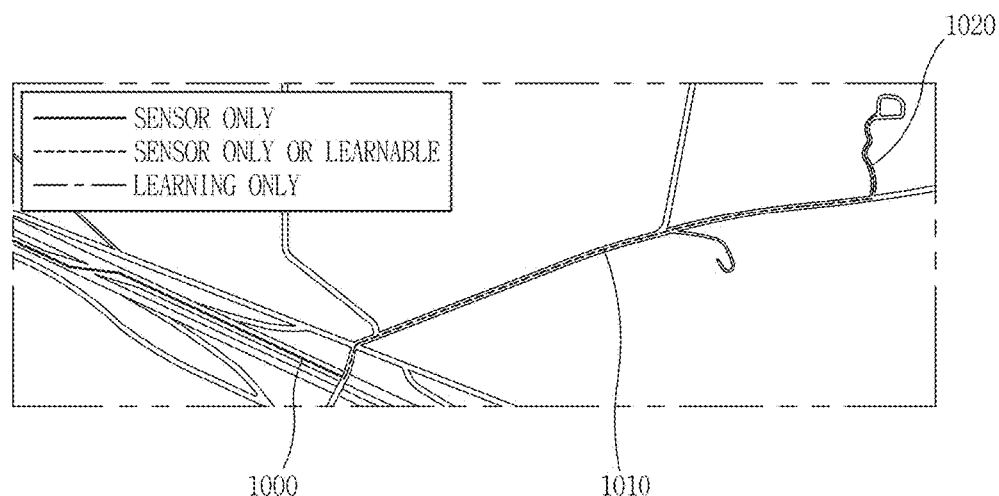
FIG. 10 depicts driving routes according to an embodiment of the present disclosure.

Referring to FIG. 10, the processor 870 may cause the vehicle to autonomously drive in at least one of the first autonomous driving mode or the second autonomous driving mode by roads.

For example, on a first road (first route information) 1000, the processor 870 may cause the vehicle to autonomously drive in the second autonomous driving mode (sensor-based autonomous driving mode) and, on a second road (second route information) 1010, the processor 870 may cause the vehicle to autonomously drive in at least one of the first autonomous driving mode and the second autonomous driving mode. Also, on a third road (third route information) 1020, the processor 870 may cause the vehicle to autonomously drive in the first autonomous driving mode (learning-based autonomous driving mode).

Whether to cause the vehicle to drive in the first autonomous driving mode, in the second autonomous driving mode, or using both the first and second autonomous driving modes may be determined depending on a type of road, whether driving information is stored in the memory, a surrounding situation or a state of the sensing unit 810, and the like.

For example, in the present disclosure, it may be defined that the vehicle should autonomously drive in the first autonomous driving mode (learning-based autonomous driving mode) or in the second autonomous driving mode (sensor-based autonomous driving mode), or using at least one of the first and second autonomous driving modes by types of road.

Accordingly, the processor 870 may cause the vehicle to autonomously drive using at least one of the first and second autonomous driving modes on the basis of the autonomous driving mode defined by types of road.

In another example, the processor 870 may cause the vehicle to autonomously drive using at least one of the first and second autonomous driving modes on the basis of a type of road sensed through the sensing unit 810.

For example, in cases where the sensed type of road is a first type of road (e.g., an expressway, etc.) the processor 870 may cause the vehicle to autonomously drive in the second autonomous driving mode (sensor-based autonomous driving mode).

In another example, in cases where the sensed type of road is a second type of road (e.g., a national highway, etc.), the processor 870 may cause the vehicle to autonomously drive in at least one of the first and second autonomous driving modes.

In another example, in cases where the sensed type of road is a third type of road (e.g., a dirt road, unpaved road, etc.) the processor 870 may cause the vehicle to autonomously drive in the first autonomous driving mode (learning-based autonomous driving mode).

In cases where driving information including a current location of the vehicle is stored in the memory 820, the processor 870 may cause the vehicle to autonomously drive in the first autonomous driving mode on the basis of the driving information.

In cases where it is impossible to recognize a lane in a surrounding environment, or in a specific weather situation (e.g., snowy, rainy, foggy, etc.), the processor 870 may cause the vehicle to autonomously drive in the first autonomous driving mode.

This is because it is difficult to sense information related to the vehicle required for autonomous driving through the sensing unit 810. In this case, the processor 870 may cause the vehicle to autonomously drive in the first autonomous driving mode on the basis of driving information regarding previous driving in the manual driving mode.

Meanwhile, the processor 870 may change at least a portion of the driving information stored in the memory 820 on the basis of information related to the vehicle sensed through the sensing unit 810 in the first autonomous driving mode (learning-based autonomous driving mode). For example, when a preset object (e.g., an obstacle, a person, and the like) is sensed or when it is sensed that a road is changed while the vehicle is autonomously driving according to the driving information regarding driving in the manual driving mode stored in the memory 820, the processor 870 may change the stored driving information on the basis of the information related to the vehicle sensed through the sensing unit 820.

That is, the processor 870 may reflect information related to the vehicle sensed through the sensing unit 810 in the driving information stored in the memory 820.

The processor 870 may store the changed driving information in the memory 820.

The processor 870 may cause the vehicle to autonomously drive on the basis of the changed driving information. Here, the processor 870 may cause the vehicle to autonomously drive according to the first scheme or the second scheme on the basis of driving trace information or driving pattern information included in the changed driving information.

When preset conditions are met in the second autonomous driving mode, the processor 870 may switch the driving mode of the vehicle from the second autonomous driving mode to the first autonomous driving mode (learning-based autonomous driving mode).

Figure 11:
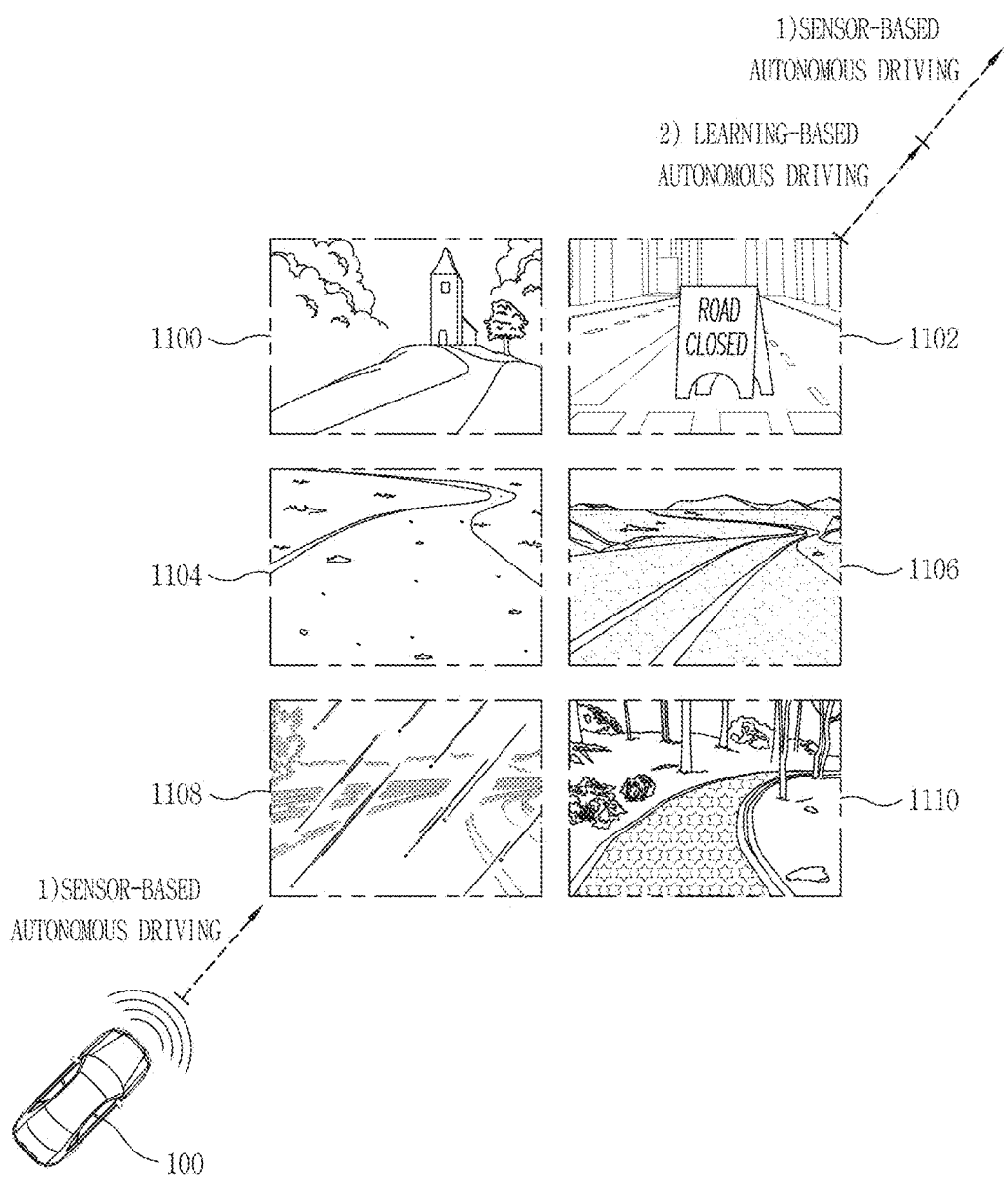
FIG. 11 depicts examples of geographical and environmental factors.

For example, referring to FIG. 11, the preset conditions may include a geographical factor and an environmental factor.

The geographical factor may include a case where a building is present on a hill, a road 1102 under construction, an unpaved road 1104, and the like.

The environmental factor may include a snowy road 1106, bad weather (heavy rain, dense fog, etc.) 1108, road 1110 with leaves, and the like.

Due to the geographical factor and the environment factor, the vehicle of the present disclosure may not be able to sense information (e.g., a land, a forward situation, and the like) related to the vehicle required for autonomous driving through the sensing unit 810, or sensed information, if ever, may have low accuracy (reliability).

Thus, as illustrated in FIG. 11, while the vehicle is autonomously driving in the second autonomous driving mode (sensor-based autonomous driving mode 1), the processor 870 may sense the preset conditions through the sensing unit 810.

When the preset conditions are met in the second autonomous driving mode, the processor 870 may switch the driving mode of the vehicle from the second autonomous driving mode to the first autonomous driving mode (learning-based autonomous driving mode 2).

Thereafter, when the preset conditions are released in the first autonomous driving mode, the processor 870 may restore (switch) the driving mode of the vehicle from the first autonomous driving mode 2 to the second autonomous driving mode 1.

In other words, in cases where information related to the vehicle sensed through the sensing unit 810 is sensed or accuracy (reliability) of the sensed information related to the vehicle is equal to or greater than a reference value in the first autonomous driving mode, the processor 870 may switch the driving mode of the vehicle to the second autonomous driving mode (sensor-based autonomous driving mode).

Also, while the vehicle is autonomously driving in the first autonomous driving mode, if the vehicle reaches a second spot (end point) of the driving information stored in the memory but has not reached a destination yet, the processor 870 may switch the driving mode to the manual driving mode or to the first autonomous driving mode.

Also, while the vehicle is autonomously driving in the first autonomous driving mode, if the vehicle reaches a second spot (end point) of the driving information stored in the memory but has not reached a destination yet, the processor 870 may output notification information indicating that driving in the first autonomous driving mode is completed.

Through this configuration, the present disclosure may provide an autonomous driving method for causing a vehicle to autonomously drive in an optimized manner by utilizing the learning-based autonomous driving mode based on information related to driving learned through manual driving (driving information regarding driving in the manual driving mode) and the sensor-based autonomous driving mode using information related to the vehicle sensed through the sensing unit.

The processor 870 may also cause the vehicle to autonomously drive to a destination using various types of route information enabling the vehicle 100 to autonomously drive to the destination through at least one of the first autonomous driving mode and the second autonomous driving mode.

Figure 12:
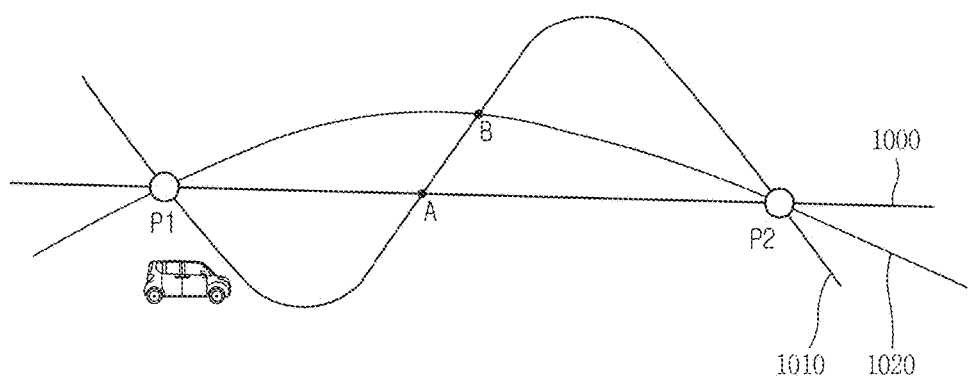
FIG. 12 depicts a driving route according to an embodiment of the present disclosure.

Referring to FIG. 12, the processor 870 may determine (sense, extract or detect) various types of route information 1000, 1010, and 1020 allowing the vehicle to autonomously drive from a current location P1 of the vehicle to a destination P2 on the basis of the driving information regarding driving in the manual driving mode stored in the memory 820 or a type of road included in map information.

The various types of route information may include route information 1020 allowing for autonomous driving in the first autonomous driving mode (learning-based autonomous driving mode), route information 1000 allowing for autonomous driving in a second autonomous driving mode (sensor-based autonomous driving mode), and route information 1010 allowing for autonomous driving in at least one of the first and second autonomous driving modes.

The processor 870 may perform autonomous driving using at least one of the various types of route information.

The processor 870 may cause the vehicle to autonomously drive according to at least one of the various types of route information on the basis of driving history (e.g., user preference) of the vehicle.

Also, the processor 870 may perform autonomous driving according to at least one of the various types of route information on the basis of a real-time traffic situation received from an external device through a communication unit.

Also, the processor 870 may output the various types of route information on the display unit 251 and cause the vehicle to autonomously drive according to route information selected through the display unit 251 among the various types of route information.

The processor 870 may also set new route information according to preset conditions using the plurality of pieces of route information 1000, 1010, and 1020.

As described above, the preset conditions may include driving history of the vehicle, a real-time traffic situation, user selection, and the like, and may further include shortest time route information (shortcut), route information regarding a route in which the vehicle drove a largest number of times (frequently accessed road), route information regarding a route in which the vehicle drives with highest fuel efficiency (road with good fuel efficiency), and the like.

The processor 870 may divide a plurality of sections with respect to crossing points A and B at which the various types of route information 1000, 1010, and 1020 cross.

The plurality of sections may include two P1-A sections, a P1-B section, an A-B section, two B-P2 sections, and an A-P2 section as illustrated in FIG. 12.

The processor 870 may set new route information by combining the plurality of sections. For example, the new route information may include a P1-A section 1000, an A-B section 1010, and a B-P2 section 1020.

In this case, the new route information may include sections (B-P2 section 1020 and A-B section 1010) in which the vehicle may drive in the first autonomous driving mode and sections (P1-A section 1000 and A-B section 1010) in which the vehicle may drive in the second autonomous driving mode.

In the A-B section 1010, the vehicle may drive in the first autonomous driving mode or in the second autonomous driving mode, and according to a situation, the vehicle may autonomously drive by switching the first and second autonomous driving modes.

The situation may be the preset conditions described above with reference to FIG. 11, and the condition that the driving mode is switched from the first autonomous driving mode to the second autonomous driving mode or from the second autonomous driving mode to the first autonomous driving mode in the A-B section 1010 will be replaced with the condition of FIG. 11.

The vehicle control device 800 may further include a display unit (not shown).

The display unit included in the vehicle control device 800 related to the present disclosure may be the display unit 251 described above, as a display device provided within the vehicle 100.

The display unit may be the output unit 250 or the display unit 251 described above with reference to FIG. 7. Also, the display unit may include an output (e.g., a touch screen) of the mobile terminal which is able to communicate with the communication apparatus 400.

Also, the display unit may include a transparent display. The transparent display may be attached to a windshield or a window.

The display unit may be implemented in a region of a steering wheel, regions 251a, 251b, and 251e of an instrument panel, a region 251d of a sheet, a region 251f of each pillar, a region 251g of a door, a region of a center console, a region of a head lining, a region of a sun visor, a region 251c of a wind shield, or a region 251h of a window.

For example, the display unit may include a cluster, a center fascia (CID), a navigation device, a head-up display (HUD), and the like.

The processor 870 may output various types of information related to the vehicle on the display unit. Also, the processor 870 may output information related to the vehicle in different positions of the display unit depending on the type of information related to the vehicle.

The display unit may be a navigation system 770 (or a navigation device). Also, the display unit may include the navigation system 770.

That is, the display unit may refer to a navigation device provided in the vehicle 100, and the navigation device may be embedded when the vehicle 100 is released or may be installed by a user.

The display unit may refer to a vehicle navigation and may refer to a navigation system independent from a navigation system provided in the mobile terminal.

In this disclosure, contents described with respect to the display unit may be inferred and applied to the navigation system 770, the navigation device, or the vehicle navigation in the same or similar manner.

The processor 870 may output route information 1010 and 1020 regarding a route for the vehicle to drive in the first autonomous driving mode and route information 1000 and 1010 for the vehicle to drive in the second autonomous driving mode on the display unit on the basis of setting of a destination P2.

Thereafter, the processor 870 may set new route information on the basis of a touch applied to the display unit.

For example, when a touch for selecting the P1-A section 1010 and the A-P2 section 1000 is applied to the display unit, the processor 870 may cause the vehicle to autonomously drive in the first or second autonomous driving mode in the P1-A-P2 sections 1010 and 1000

Here, the processor 870 may cause the vehicle to autonomously drive in the first or second autonomous driving mode in the P1-A section 1010 and cause the vehicle to autonomously drive in the second autonomous driving mode in the A-P2 section.

Figure 13A:
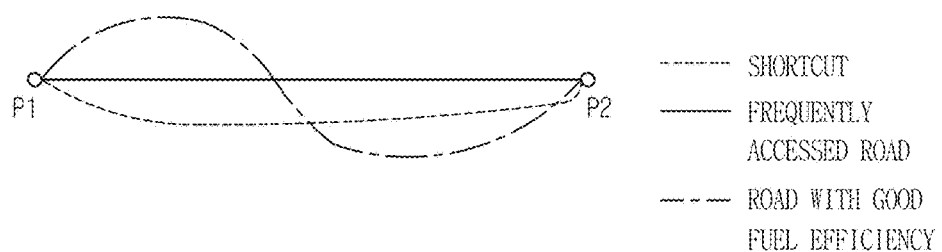
FIGS. 13A, 13B, 14A, 14B, 14C, 15A, 15B depict various driving routes according to an embodiment of the present disclosure.

Referring now to FIG. 13A, the processor 870 may output, on the display unit, a plurality of pieces of route information appropriate for conditions set by the user, among various types of route information in which the vehicle may autonomously drive from the current location P1 to the destination P2

For example, when conditions set by the user is shortest time route information (shortcut), route information regarding a route in which the vehicle drove a largest number of times (frequently accessed road), route information regarding a route in which the vehicle drives with highest fuel efficiency (road with good fuel efficiency), and the like, the processor 870 may output a plurality of pieces of route information corresponding to the set conditions as illustrated in FIG. 13A.

Figure 13B:
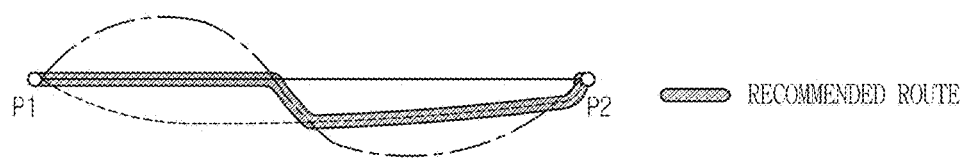

Also, as illustrated in FIG. 13B, the processor 870 may divide the various types of route information into a plurality of sections with respect to crossing points, and generate new route information (recommended route) using some of the plurality of divided sections.

For example, on the basis of new conditions received from the user, information (e.g., real-time traffic information) received through a communication device, or preset conditions, the processor 870 may set new route information.

The vehicle control device 800 (FIG. 8) related to the present disclosure may further include a communication unit (not shown).

The communication unit may be the aforementioned communication apparatus 400. The communication unit may be connected to a mobile terminal present within the vehicle or a mobile terminal present outside of the vehicle to perform communication.

For example, the vehicle control device 800 (or the vehicle 100) and a mobile terminal may be connected for wireless communication through a communication unit. The vehicle control device 800 and the mobile terminal may be wirelessly connected for wireless communication according to a user request, or if the vehicle control device 800 and the mobile terminal have been connected for wireless communication, when the mobile terminal enters the inside of the vehicle, the vehicle control device 800 and the mobile terminal may be wirelessly connected for wireless communication.

The communication unit may be provided within the vehicle (or within the vehicle control device) or may be provided as a separate module which can communicate with (or which is electrically coupled to) a component of the vehicle.

The vehicle control device 800 may control the mobile terminal through the communication unit.

In detail, the vehicle control device 800 may transmit a control signal for controlling a mobile terminal, such as mobile terminal 400, to the mobile terminal 400 through the communication unit. When the control signal is received, the mobile terminal 400 may perform a function/operation/control corresponding to the control signal.

Conversely, in the present disclosure, the mobile terminal 400 may control the vehicle control device 800 (or vehicle 100). In detail, the mobile terminal 400 may transmit a control signal for controlling the vehicle to the vehicle control device 800. In response, the vehicle control device 800 may perform function/operation/control corresponding to the control signal transmitted from the mobile terminal 400.

The processor 870 may transmit and receive information (data, signal, control command) to and from the mobile terminal through the communication unit. The vehicle control device 800 may transmit information to the mobile terminal or may receive information from the mobile terminal through a mobile communication network.

The mobile terminal may be an authenticated mobile terminal, for example. For example, the authenticated mobile terminal may be a mobile terminal owned by an owner (driver, user) of the vehicle 100.

The vehicle control device 800 related to the present disclosure may cause the vehicle to autonomously drive in the first autonomous driving mode or the second autonomous driving mode without a driver.

For example, the processor 870 may receive, from a mobile terminal, information for calling the vehicle to a location of the mobile terminal present in the location different from a current location of the vehicle through the communication unit.

When the information for calling the vehicle to the location of the mobile terminal different from the current location of the vehicle is received from the mobile terminal through the communication unit, the processor 870 may search for route information regarding a route in which the vehicle may autonomously drive to the location of the mobile terminal using at least one of the first autonomous driving mode and the second autonomous driving mode.

Figure 14A:
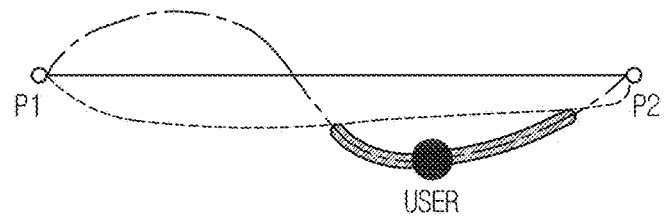

For example, as illustrated in FIG. 14A, when the information for calling the vehicle to the location of the mobile terminal is received through the communication unit, the processor 870 may determine route information regarding a route in which the vehicle may drive to the location of the mobile terminal, among a plurality of pieces of route information regarding routes available for autonomous driving.

Here, the location of the mobile terminal may correspond to a location of the user. This is because, generally, the user carries along the mobile terminal.

The processor 870 may cause the vehicle to autonomously drive to the location of the mobile terminal according to the determined route information.

Figure 14B:
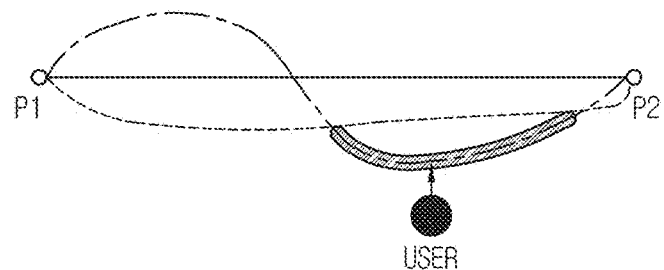

Meanwhile, as illustrated in FIG. 14B, if there is no route information regarding a route in which the vehicle may autonomously drive to the location of the mobile terminal, the processor 870 may select route information allowing the vehicle to go through a spot closest to the location of the mobile terminal, among the plurality of pieces of route information regarding routes available for the vehicle to autonomously drive.

Thereafter, the processor 870 may cause the vehicle to autonomously drive according to the route information regarding a route available for the vehicle to go through the closest spot.

When the route information is searched (selected), the processor 870 may transmit information related to the searched (selected) route information to the mobile terminal through the communication unit. The information related to the route information may include an estimated arrival time at which the vehicle is anticipated to reach the location of the mobile terminal, the route, the closest spot, and the like.

The mobile terminal may be a mobile terminal of another user, rather than the mobile terminal of the driver.

Figure 14C:
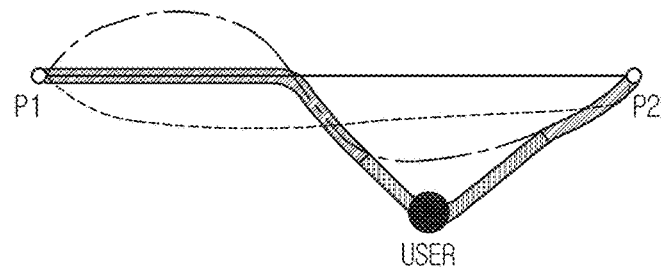

As illustrated in FIG. 14C, in cases where the mobile terminal is a mobile terminal of another user and a driver is present in the vehicle, the processor 870 may select route information regarding a route in which the vehicle may autonomously drive to a spot closest to the location of the mobile terminal, among the various types of route information, and perform autonomous driving.

Thereafter, as illustrated in FIG. 14C, the processor 870 may generate new route information including a route in which manual driving should be performed.

That is, the processor 870 may cause the vehicle to autonomously drive in the first or second autonomous driving mode, and when the vehicle reaches a route in which the vehicle should perform manual driving, the processor 870 may switch the driving mode of the vehicle from the autonomous driving mode to a manual driving mode.

The processor 870 may cause the vehicle to drive to the location of the mobile terminal using both the autonomous driving mode and the manual driving mode.

Figure 15A:
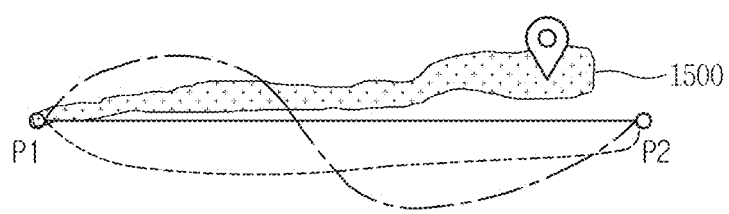

As illustrated in FIG. 15A, the vehicle may reach the destination P2 earlier when driving in the manual driving mode, rather than using the various types of route information regarding routes in which the vehicle may drive in the first or second autonomous driving mode.

In this case, as illustrated in FIG. 15A, the processor 870 may select route information 1500 regarding a route in which the vehicle is to drive in the manual driving mode, and display a road guide on the display unit.

When manual driving is performed through the route information 1500 regarding a route in which the vehicle is to drive in the manual driving mode, the processor 870 may store, in the memory 820, driving information regarding driving in the manual driving mode. Thereafter, when the same destination is set, the processor 870 may cause the vehicle to autonomously drive to the destination using the stored driving information (learning-based autonomous driving mode).

Figure 15B:
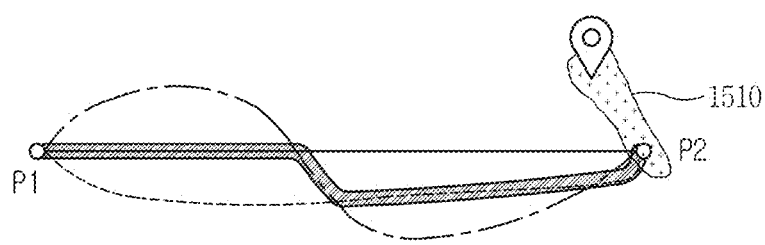

As shown in FIG. 15B, in cases where it is impossible to drive to reach the destination only in the autonomous driving mode, route information 1510 may be set such that the vehicle drives in the manual driving mode in a certain section.

In this case, the processor 870 may cause the vehicle to autonomously drive using a plurality of routes available for driving in the first and second autonomous driving mode and cause the vehicle to drive in the manual driving mode in the certain section.

Also, in this case, information related to driving learned in the certain section (i.e., driving information regarding driving in the manual driving mode in the certain section) may be stored in the memory 820 and may be used in the first autonomous driving mode later.

Figure 16A:
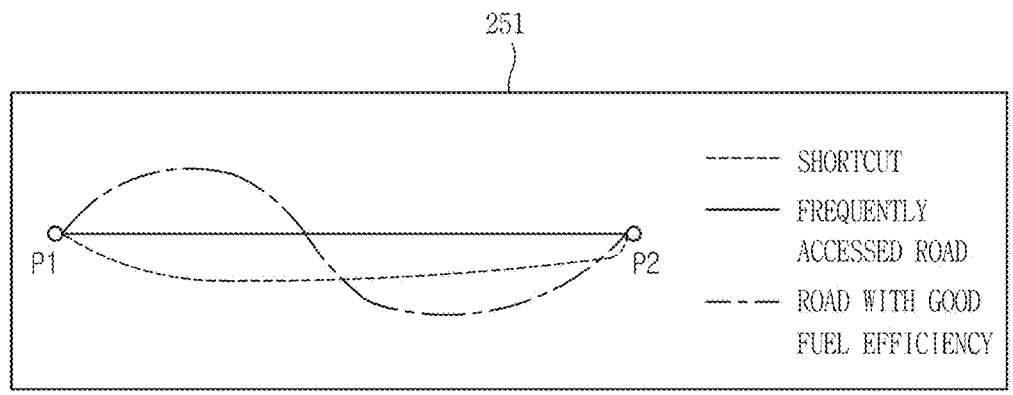
FIG. 16A depicts a driving route between two points.
Figure 16B:
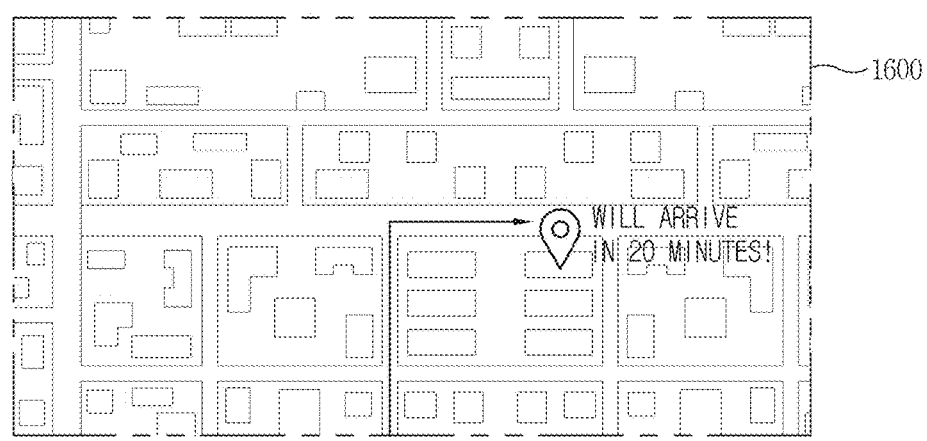
FIG. 16B is an example of a map displayed with regard to the route of FIG. 16A.

As illustrated in FIG. 16A, when new route information is generated through a plurality of routes available for driving in the autonomous driving mode on the display unit 251, the processor 870 may transmit information related to the new route information to the mobile terminal through the communication unit.

The information (e.g., an estimated arrival time and a vehicle get-in spot) related to the new route information may be output on a display unit 1600 of the mobile terminal.

Through this configuration, in the present disclosure, by causing the vehicle to autonomously drive through the learning-based autonomous driving mode, the vehicle may autonomously drive even in a section not available for autonomous driving in the sensor-based autonomous driving mode.

Also, the present disclosure may provide a vehicle control method capable of minimizing a manual operation by providing the learning-based autonomous driving mode. Also, the present disclosure may provide a new vehicle interface in which sections available for autonomous driving is increased as driving information regarding driving in the manual operation mode is increased.

According to embodiments of the present disclosure, one or more effects may be obtained as follows.

First, the present disclosure may provide the new autonomous driving method capable of causing a vehicle to autonomously drive on the basis of information related to driving learned through manual driving.

Second, the present disclosure may provide the vehicle control device capable of causing a vehicle to autonomously drive through at least one of a learning-autonomous driving mode learned through manual driving and a sensor autonomous driving mode using a sensing unit and the method for controlling a vehicle.

Third, the present disclosure may provide the method for controlling a vehicle, capable of causing a vehicle to autonomously drive in the learning autonomous driving mode in a section in which it is impossible to drive in the sensor autonomous driving mode Fourth, the present disclosure may provide the method for controlling a vehicle, capable of performing an optimized autonomous driving mode of a vehicle by causing the vehicle to drive in any one of the learning autonomous driving mode and the sensor autonomous driving mode or using a combination of the both modes.

Advantages and effects of the present disclosure are not limited to the foregoing effects and any other technical effects not mentioned herein may be easily understood by a person skilled in the art from the descriptions of claims.

The vehicle control device 800 described above may be included in the vehicle 100.

Also, the operations or the control method of the vehicle control device 800 described above may be inferred and applied as the operations or the control method of the vehicle 100 (or the controller 170) in the same or similar manner.

For example, a method for controlling the vehicle (or a method for controlling the vehicle control device 800) may include storing in the memory driving information regarding driving of the vehicle in the manual driving mode and causing the vehicle to drive in the autonomous driving mode on the basis of the stored driving information.

Here, the driving information regarding driving in the manual driving mode may include at least one of driving trace information regarding driving of the vehicle and driving pattern information of the vehicle, and in causing the vehicle to drive, the vehicle may be caused to autonomously drive on the basis of any one of a first scheme in which the vehicle autonomously drives using only the driving trace information included in the driving information and a second scheme in which the vehicle is autonomously drives according to the driving trace information and the driving pattern information included in the driving information.

Also, in causing the vehicle to drive in the autonomous driving mode, the vehicle may be caused to autonomously drive using at least one of a first autonomous driving mode in which the vehicle autonomously drives on the basis of the driving information stored in the memory and a second autonomous driving mode in which the vehicle autonomously drives on the basis of information related to vehicle sensed through the sensing unit.

A more specific embodiment may be replaced with the contents described above or may be inferred and applied in the same manner.

Each operation described above may also be performed by the controller 170 provided in the vehicle 100, as well as by the vehicle control device 800.

Also, all the functions, configurations, or control methods performed by the vehicle control device 800 described above may be performed by the controller 170 provided in the vehicle 100. That is, all the control methods described in this disclosure may be applied to the control method of the vehicle and to the control method of the control device.

In addition, all the functions, configurations, or control methods performed by the vehicle control device 800 described above may be performed by the controller of the mobile terminal. Also, all the control methods described in this disclosure may be inferred and applied to the control method of the mobile terminal in the same or similar manner.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 170. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device comprising:
 a memory; and
 a processor configured to:
  store, in the memory, driving information that is based on driving of a vehicle in a manual driving mode; and
  receive information related to the vehicle from a sensor of the vehicle;
  cause the vehicle to autonomously drive using any of at least one of a first autonomous driving mode in which the vehicle autonomously drives based on the driving information stored in the memory and a second autonomous driving mode in which the vehicle autonomously drives based on the received information from the sensor;
  wherein the first autonomous driving mode includes:

a first scheme in which the vehicle autonomously drives using only driving trace information; and a second scheme in which the vehicle autonomously drives using driving trace information and driving pattern information, and wherein the processor is further configured to cause the vehicle to autonomously drive according to any one of the first and second schemes based on whether the vehicle is driven in the second autonomous driving mode before the vehicle has been driven in the first autonomous driving mode.

2. The vehicle control device of claim 1, wherein the processor is further configured to:

store, in the memory, the driving information which further includes information that is based on driving the vehicle from a first location to a second location in the manual driving mode, wherein the first location is different from the second location; and cause the vehicle to drive in the first autonomous driving mode based on the stored driving information, when the vehicle is manually driven to the first location.

3. The vehicle control device of claim 1, wherein the driving information includes at least one of the driving trace information regarding driving of the vehicle, or the driving pattern information of the vehicle.

4. The vehicle control device of claim 3, wherein the driving trace information includes location information of a plurality of locations at which the vehicle was present; and the driving pattern information includes at least one of steering angle information at each of the plurality of locations or speed information at each of the plurality of locations.

5. The vehicle control device of claim 1, wherein the processor is further configured to:

change at least a portion of the driving information stored in the memory based on the received information from the sensor, when in the first autonomous driving mode; and cause the vehicle to be autonomously driven in the first autonomous driving mode based on the changed driving information.

6. The vehicle control device of claim 1, wherein the processor is further configured to:

switch from the second autonomous driving mode to the first autonomous driving mode when preset conditions are met.

7. The vehicle control device of claim 6, wherein the processor is further configured to:

switch from the first autonomous driving mode to the second autonomous driving mode when the preset conditions are released.

8. The vehicle control device of claim 1, wherein the processor is further configured to:

cause the vehicle to be autonomously driven to a destination using a plurality of route information regarding routes based on at least one of the first autonomous driving mode or the second autonomous driving mode.

9. The vehicle control device of claim 8, wherein the processor is further configured to:

set new route information according to preset conditions using the plurality of route information.

10. The vehicle control device of claim 9, wherein the processor is further configured to:

set the new route information by dividing a predetermined region into a plurality of sections with respect to a crossing point at which a plurality of routes cross, and combining the plurality of sections.

11. The vehicle control device of claim 10, wherein the new route information includes a section in which the vehicle can be driven in the first autonomous driving mode and a section in which the vehicle can be driven in the second autonomous driving mode.

12. The vehicle control device of claim 9, further comprising:

a display, wherein the processor is further configured to:

cause the display to display route information regarding a route available for driving in the first autonomous driving mode and route information regarding a route available for driving in the second autonomous driving mode; and set the new route information based on input received at the display.

13. The vehicle control device of claim 1, further comprising:

a communication unit, wherein the processor is further configured to:

receive from a mobile terminal, via the communication unit, information for requesting the vehicle at a location of the mobile terminal, wherein the location of the mobile terminal is different from a current location of the vehicle; and search for information for a route in which the vehicle can be autonomously driven to the location of the mobile terminal using at least one of the first autonomous driving mode or the second autonomous driving mode.

14. The vehicle control device of claim 13, wherein the processor is further configured to:

transmit information, via the communicating unit, to the mobile terminal, wherein the transmitted information relates to the route.

15. A method for controlling a vehicle, the method comprising:

storing, in a memory, driving information that is based on driving of a vehicle in a manual driving mode; and receiving information related to the vehicle from a sensor of the vehicle;

causing the vehicle to autonomously drive using any of at least one of a first autonomous driving mode in which the vehicle autonomously drives based on the driving information stored in the memory and a second autonomous driving mode in which the vehicle autonomously drives based on the received information from the sensor;

wherein the first autonomous driving mode includes:

a first scheme in which the vehicle autonomously drives using only driving trace information; and a second scheme in which the vehicle autonomously drives using driving trace information and driving pattern information, and causing the vehicle to autonomously drive according to any one of the first and second schemes based on whether the vehicle is driven in the second autonomous driving mode before the vehicle has been driven in the first autonomous driving mode.

* * * * *